United States Patent [19]
Ritzenhoff

[11] Patent Number: 4,786,362
[45] Date of Patent: Nov. 22, 1988

[54] PROCESS FOR PRODUCING DECORATIVE OR INFORMATIVE PATTERNS ON OBJECTS FORMED OF SINGLY OR MULTIPLY PLATED METAL SHEETS

[75] Inventor: Hermann Ritzenhoff, An der Schäferbuche 14, D-3550 Marburg/Lahn, Fed. Rep. of Germany

[73] Assignee: Hermann Ritzenhoff, Marburg/Lahn, Fed. Rep. of Germany

[21] Appl. No.: 151,399

[22] Filed: Feb. 2, 1988

[51] Int. Cl.[4] .................... B44C 1/22; C03C 15/00; C03C 25/06; C23F 1/02

[52] U.S. Cl. .................... 156/645; 156/652; 156/656; 156/665; 252/79.2; 252/79.3

[58] Field of Search .................... 252/79.2, 79.3; 156/639, 645, 652, 656, 659.1, 665; 204/8, 129.1, 129.9

[56] References Cited

U.S. PATENT DOCUMENTS

| | | | |
|---|---|---|---|
| 1,862,231 | 6/1932 | McFarland | 156/659.1 X |
| 2,354,756 | 8/1944 | Keuffel et al. | 156/659.1 X |
| 2,731,333 | 1/1956 | Ko et al. | 156/652 |
| 3,197,391 | 7/1965 | Bowers | 204/33 |
| 3,503,815 | 3/1970 | Johnson | 156/652 X |
| 3,839,163 | 10/1974 | Kaneda et al. | 204/18 R |
| 4,242,378 | 12/1980 | Arai | 156/659.1 X |
| 4,543,153 | 9/1985 | Nelson | 156/656 |

FOREIGN PATENT DOCUMENTS

| | | |
|---|---|---|
| 2288795 | 5/1976 | France . |
| 522516 | 6/1972 | Switzerland . |

OTHER PUBLICATIONS

Chemical Abstracts, Band 95, No. 4, Aug. 1981, Seite 537, Zusammenfassung No. 69897b, Columbus, Ohio, US; and Translation of JP-A-81 10 999 (Fujita Metal Trading Co., Ltd.), 11-03-1981.

*Primary Examiner*—William A. Powell
*Attorney, Agent, or Firm*—Scully, Scott, Murphy & Presser

[57] ABSTRACT

According to the invention a method for producing decorative or informative patterns on objects made of plated metal sheets is disclosed. The procedure is to remove the outer plated layer mechanically or chemically as far as at least one of the lower layers in the shape of the desired pattern. The object thus obtained, with the exposed lower layer or layers, is then treated in one and the same surface treatment bath, with which the outer and the inner layers react differently. It is advantageous to use aluminum of different degrees of purity for plated layers and to use a polishing bath for the surface treatment.

5 Claims, No Drawings

PROCESS FOR PRODUCING DECORATIVE OR INFORMATIVE PATTERNS ON OBJECTS FORMED OF SINGLY OR MULTIPLY PLATED METAL SHEETS

TECHNICAL FIELD OF THE INVENTION

The invention relates to a process according to the preamble of claim 1, and is based on the fact that the main way of plating sheets together is by rolling. This results in a new composite material made up of two or more layers.

BACKGROUND OF THE INVENTION AND PRIOR ART

A process of the kind mentioned above is described in the Japanese Patent Application No. 56-10999 (10999/81). The object of this known process is to provide the surface of a plated object having a layer of aluminium and a layer of stainless steel with a coloured pattern. For this purpose the surface of the layer of stainless steel to be patterned is coated with a corrosion resistant film which exhibits the pattern in the form of holes in the film. The surface coated with the film is then etched and electrolytically polished. The etching removes the outer layer of material so that the inner layer is exposed. The exposed inner layer is then coated with a coloured layer, thereby creating the desired pattern.

OBJECT OF THE INVENTION

The object of the invention is to improve a process of the kind mentioned above so that a decorative or informative pattern can be created even without additional coating.

BRIEF DESCRIPTION OF THE INVENTION

This object is achieved by the characterising features of claim 1.

According to the invention it has been discovered that plated layers of aluminium of different composition, such as different purity, can produce decorative of informative patterns of various kinds by surface treatment in a single treatment bath owing to different reactivities of the layers. Thus, it has been found that, when using aluminium alloys as the material for the plated layers, even slightly different compositions give decorative or informative patterns although only one treatment bath is used. This is due to the different reactivities of the individual material layers with the treatment bath. The exposure or removal of the outer plated layer can occur by chemical or mechanical methods. To obtain the desired affect it is essential to use one and the same treatment bath with which the individual plated layers react differently. In other words use is made according to the invention of the different responses to one and the same treatment bath that the plated layers of different compositions are discovered to have, in order to obtain different and contrasting effects in the raised and the lower layers.

DETAILED DESCRIPTION OF THE INVENTION

The application of the teaching claimed will be described in the following example.

From plated sheets manufactured from two different aluminium alloys stoppers, ornamental caps or similar parts, e.g. for cosmetic products, are formed by coldworking methods. This can for example provide on the outside a highly polished layer and on the inside a less polished layer. In the course of subsequent treatment of the blanks, parts of the outer layer corresponding to the patterns are removed by known processes, so that articles result whose outer surface is interrupted by the lower surfaces of different composition. If such an article is now put into a surface treatment bath and there, e.g., chemically or electrolytically polished, and possibly also anodised and coloured, the treatment in one and the same bath is enough by itself to give highly-polished and matt surfaces side by side, in the above-mentioned case with the highly-polished layer on the outside and the matt layer on the inside. Such effective differences are in great demand in many ornamental devices, decorative or informative or advertising parts and objects of applied art and sign plates of all kinds.

Conversely one can of course, by suitable choice of the plated layers, make the outer raised layer matt and the inner one highly-polished. Here too what matters is the use of one and the same bath with which the layers react differently.

A particular advantage of the procedure claimed is that the individual articles can be economically finished in a single operation. For this one can make use in particular of chemical and electrolytic polishing processes which lead, for example, in one and the same bath, owing to the different materials of the layers, on the one hand to polished and on the other hand to entirely matt surfaces, or to surfaces that are only differently polished.

The individual plating layers can e.g. consist of aluminium of different purity, for example on the outside an aluminium material with between 99.8 and 99.99% Al (balance impurities in the form of Fe, Si, Mn and other metals) and on the inside one with between 99.0 and 99.5% Al (balancing impurities in the form of Fe, Si, Mn and other metals).

The removal can be performed mechanically or chemically, as already mentioned. A particular way of removing material is burning it out with the aid of laser beams. Thus it is possible to burn out previously programmed characters or figures of all kinds from the outer plated layer, which may for example later be highly polished.

The composition of the surface treatment bath can vary within wide limits, provided only that the individual plated layers respond differently to it. Exemplary compositions of a polishing bath are:

A.

50 parts by weight of sulfuric acid (68%),
50 parts by weight of phosphoric acid (68%) and
40 g dissolved Al per kg of bath liquid

B.

92 parts by weight of phosphoric acid (85%),
3–5 parts by weight of nitric acid (53%) and
3–5 parts by weight of copper sulphate

C.

11 parts by weight of hydrofluoric acid (73%),
12 parts by weight of nitric acid (53%),
7 parts by weight of ammonium bifluoride and
70 parts by weight of water If for example what matters is to bring about different degrees of polish, the plated shaped body (e.g. outside 99.9%, inside 99.5% Al) is dipped into a polishing bath having one of the above compositions A to C and possibly further treated in the usual way, e.g. by anodising and colouring.

What is claimed is:

1. A process for producing decorative or informative patterns on objects that are made up of singly or possibly multiply plated metal sheets, wherein the outer plated layer is removed in the shape of the desired pattern down to at least one of the underlying plated layers, and the object is subsequently treated to obtain different surfaces, characterised in that plated layers of aluminium alloys of different composition are used for the object and that after the removal of the outer plated layer the object is treated in one and the same surface treatment bath with which the outer and the inner aluminium alloy layers react differently.

2. A process according to claim 1, characterised in that the surface treatment bath is a polishing bath, etching bath or pickling bath which gives the aluminium alloy layers a different surface effect.

3. A process according to claim 1, characterised in that the outer aluminium alloy layer is removed mechanically.

4. A process according to claim 1, characterised in that the outer aluminium alloy layer is removed chemically.

5. A process according to claim 1, characterised in that the outer aluminium alloy layer is removed with the aid of laser beams.

* * * * *